United States Patent
Kuo et al.

(10) Patent No.: US 12,068,269 B2
(45) Date of Patent: Aug. 20, 2024

(54) METHOD AND SYSTEM FOR VERIFYING INTEGRATED CIRCUIT STACK HAVING PHOTONIC DEVICE

(71) Applicant: Taiwan Semiconductor Manufacturing Company, Ltd., Hsinchu (TW)

(72) Inventors: Feng-Wei Kuo, Hsinchu County (TW); Hui-Yu Lee, Hsin-Chu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 18/306,994

(22) Filed: Apr. 25, 2023

(65) Prior Publication Data

US 2023/0268301 A1    Aug. 24, 2023

Related U.S. Application Data

(63) Continuation of application No. 16/801,160, filed on Feb. 26, 2020, now Pat. No. 11,670,610.

(60) Provisional application No. 62/889,060, filed on Aug. 20, 2019.

(51) Int. Cl.
*G06F 30/30* (2020.01)
*G01R 31/317* (2006.01)
*G06F 30/31* (2020.01)
*G06F 30/398* (2020.01)
*H01L 23/00* (2006.01)

(52) U.S. Cl.
CPC ........ *H01L 24/11* (2013.01); *G01R 31/31704* (2013.01); *G06F 30/31* (2020.01); *G06F 30/398* (2020.01); *H01L 2224/051* (2013.01); *H01L 2224/11011* (2013.01); *H01L 2924/14* (2013.01)

(58) Field of Classification Search
CPC .............. H01L 24/11; H01L 2224/051; H01L 2224/11011; H01L 2924/14; H01L 2224/16145; G01R 31/31704; G06F 30/31; G06F 30/398; G06F 2111/12; G06F 16/58
See application file for complete search history.

(56) References Cited

U.S. PATENT DOCUMENTS

| | | | |
|---|---|---|---|
| 10,185,799 B2 * | 1/2019 | Cao ........................ | G06F 30/398 |
| 2006/0015276 A1 * | 1/2006 | Goren .................... | G06F 30/367 |
| | | | 702/65 |
| 2016/0055122 A1 * | 2/2016 | Koranne ............ | G02B 6/12011 |
| | | | 703/2 |
| 2016/0055289 A1 * | 2/2016 | Cao ........................ | G06F 30/398 |
| | | | 716/112 |

(Continued)

*Primary Examiner* — Jack Chiang
*Assistant Examiner* — Brandon Bowers
(74) *Attorney, Agent, or Firm* — JCIPRNET

(57) ABSTRACT

A method and a system for verifying an integrated circuit stack having a silicon photonic (SIPH) device is introduced. A single first dummy layer is added to at least one terminal of the SIPH device in a first layout of the first integrated circuit, wherein a shape of the single first dummy layer added to the at least one terminal of the SIPH device maps a shape of the at least one terminal of the SIPH device. A first layout versus schematic (LVS) check is performed on the first integrated circuit based on the single first dummy layer added to the at least one terminal of the SIPH device to verify a connection of the SIPH device in the first integrated circuit.

20 Claims, 13 Drawing Sheets

--- adding a dummy layer and a dummy layer text to a terminal of at least one silicon photonic device of an integrated circuit — S1010 performing a layout versus schematic check of the integrated circuit including the dummy layer and the dummy layer text — S1020

(56) References Cited

U.S. PATENT DOCUMENTS

2016/0136899 A1\* 5/2016 Koranne ............... G06F 17/175
                                                                         700/98

\* cited by examiner

METHOD AND SYSTEM FOR VERIFYING INTEGRATED CIRCUIT STACK HAVING PHOTONIC DEVICE

CROSS-REFERENCE TO RELATED APPLICATION

This application is a continuation application of and claims the priority benefit of U.S. patent application Ser. No. 16/801,160, filed on Feb. 26, 2020. The U.S. patent application Ser. No. 16/801,160 claims the priority benefit of U.S. provisional application Ser. No. 62/889,060, filed on Aug. 20, 2019. The entirety of the above-mentioned patent application is hereby incorporated by reference herein and made a part of this specification.

BACKGROUND

In semiconductor manufacturing, stacking circuits (or semiconductor dies) on top of one another is used to reduce an overall size of an integrated circuit. The stacking of circuits includes forming electrical connections among the stacked circuits in order to transfer signals between different portions of the integrated circuit. Contact pads are commonly used to electrically connect the stacked circuits. If contact pads between different portions of the stacked circuits are not properly aligned, a risk of an open circuit or a short circuit is increased.

When the integrated circuit includes a silicon photonic (SiPH) device such as a grating coupler (GC), a waveguide device, a directional coupler (DC), modulator in at least one of the stacked circuits, it is a challenge to verify a connection and routing quality of the SiPH devices and stacking quality of the integrated circuit stack.

In order to verify the connection and routing quality of the SiPH devices and the stacking quality of the integrated circuit stack, a verification methodology is developed to determine whether any open circuits or short circuits are present in the design.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE EMBODIMENTS

Figure 1:
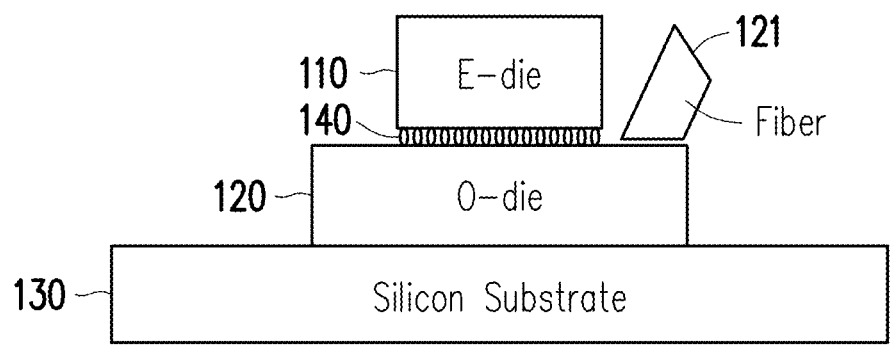
FIG. 1 is a schematic diagram illustrating an integrated circuit stack in accordance with some embodiments.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates an integrated circuit stack 100 in accordance with some embodiments. The integrated circuit stack 100 may include an optical die 120 (i.e. O-die, also referred to as a first integrated circuit), an electronic die 110 (i.e. E-die, also referred to as a second integrated circuit) 110 and a silicon substrate 130. In some embodiments, the electronic die 110 may be stacked on top of the optical die 120; and the stack of the electronic die 110 and the optical die 120 may be placed on the silicon substrate 130. In some alternative embodiments, the optical die 120 may be stacked on top of the electronic die 110.

The electronic die 110 may include functional circuitry configured to execute at least one operation of integrated circuit stack 100. In some embodiments, the electronic die 110 may include complementary metal-oxide-semiconductor (CMOS) devices, fin field-effect-transistor (FinFET) devices, other two-dimensional channel devices, other three-dimensional channel devices, or other suitable functional circuitry. The electronic die 110 may include contact pads (not shown) configured to be electrically coupled to the optical die 120.

The optical die 120 may include functional circuitry configured to execute at least one operation of integrated circuit stack 100. In some embodiments, the optical die 120 may include at least one silicon photonic (SiPH) device such as a grating coupler, a waveguide device, a directional coupler, a modulator, and other optical devices. The optical die 120 may include contact pads (not shown) configured to be electrically coupled to the electronic die 110. In some embodiments, the optical die 120 may be electrically connected to the electronic die 110 through a connecting interface 140. In some embodiments, the optical die 120 may be coupled to a fiber array 121 for communicating with other circuits through a fiber-optic communication. The fiber array 121 may include a plurality of optical fibers that are used to transfer information through optical signals (e.g., pulses of light).

In some embodiments, the contact pads of the electronic die 110 are configured to be aligned to the corresponding contact pads of the optical die 120. Misalignment of contact pads of the electronic die 110 and the corresponding contact pads of the optical die 120 may increase a risk of a short circuit or an open circuit of the integrated circuit stack 100. In some embodiments, the contact pads of the electronic die 110 are coupled to the corresponding contact pads of the optical die 120 through the connecting interface 140. The connecting interface 140 may include a plurality of micro bumps that are configured to be electrically coupled to the contact pads of the electronic die 110 and the corresponding contact pads of the optical die 120.

Figure 2:
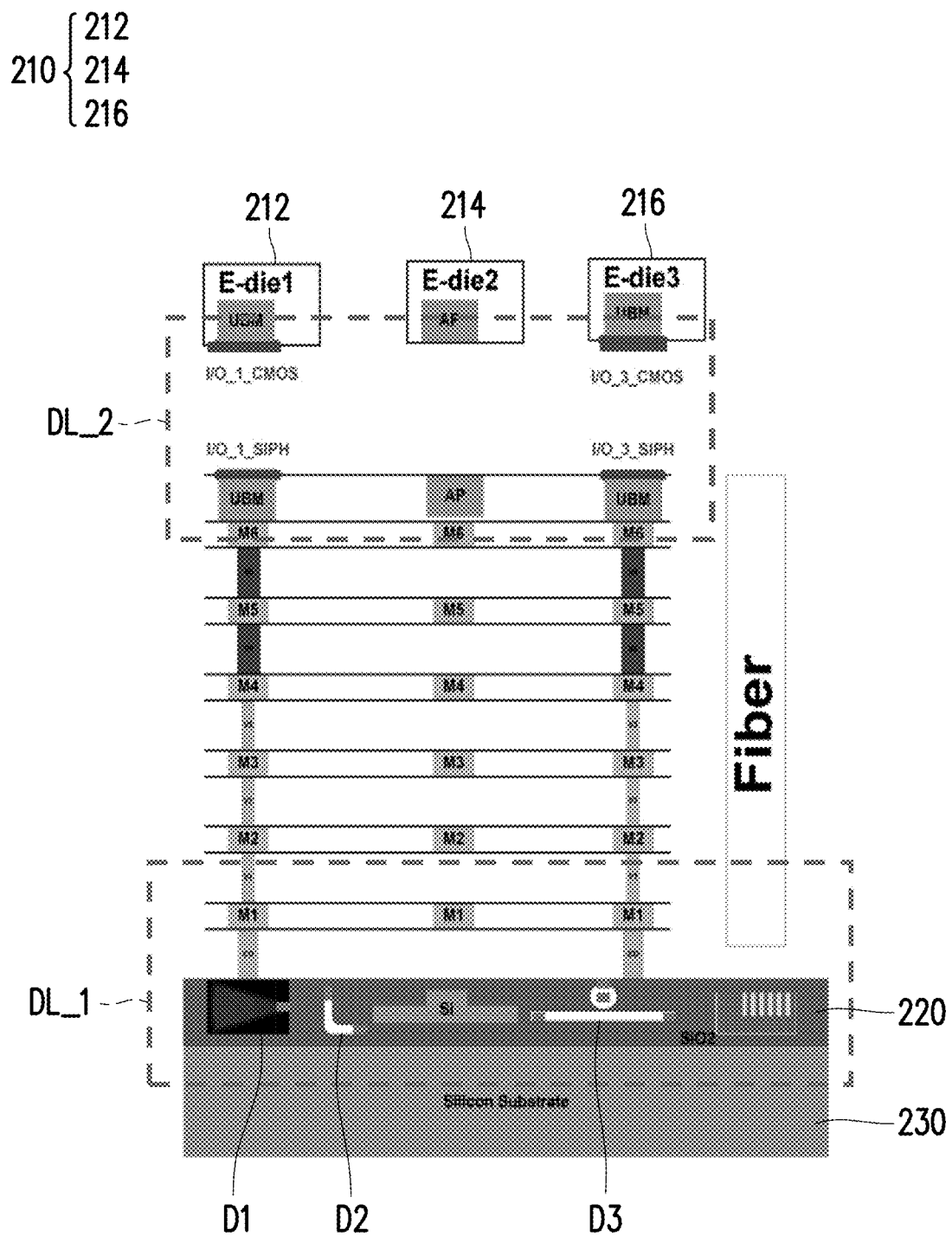
FIG. 2 is a cross sectional view of an integrated circuit stack in accordance with some embodiments.

FIG. 2 illustrates a cross sectional view of an integrated circuit stack 200 in accordance with some embodiments. The integrated circuit stack 200 may include an electronic die 210 and an optical die 220 having similar connections to the connections between the electronic die 110 and the optical die 120 as shown in FIG. 1. The electronic die 210 may include dies 212, 214, and 216, in which each of the dies 212, 214, and 216 may include circuitry configured for performing at least one operation of the integrated circuit stack 200. Among the dies 212, 214 and 216 of the electronic die 210, the dies 212 and 216 are configured to be electrically coupled to the optical die 220, and the die 214 are not electrically coupled to the optical die 220. In some embodiments, the electronic die 210 may be electrically coupled to the optical die 220 through an under bump metallization layer UBM, metallization layers M1 through M6 and via layers V1 through V5.

The optical die 220 may include SiPH devices D1 through D3. In some embodiments, the SiPH device D1 may be or may include a grating coupler; the SiPH device D2 may be or may include a 90-degree bending device; and the SiPH device D3 may be or may include a micro-ring modulator. The SiPH devices D1 through D3, individually or in combination, may perform at least one functionality of the integrated circuit stack 200.

In some embodiments, a dummy layer DL_1 is added to at least one terminal of the SiPH devices D1 through D3 of the optical die 220 to perform verification of the optical die 220. The verification may include determining a connection and routing quality of the SiPH devices D1 through D3 of the optical die 220.

In some embodiments, a dummy layer DL_2 is added to contact pads of the electronic die 210 for performing the verification of the integrated circuit stack 200. In some embodiments, the dummy layer DL_2 is added to contact pads of the optical die 220 for performing the verification of the integrated circuit stack 200. In some embodiments, the dummy layer DL_2 is added to both the contact pads of the electronic dies 210 and the corresponding contact pads of the optical die 220 to perform the verification of the integrated circuit stack 200. For example, the second dummy layer is added to the contact pads I/O_1_CMOS and I/O_3_CMOS of the E-dies 212 and 216, and is also added to the contact pads I/O_1_SIPH and I/O_3_SIPH of the optical dies. In some embodiments, the verification may include determining a stacking quality of the electronic die 210 and the optical die 220 of the integrated circuit stack 200.

Figure 3:
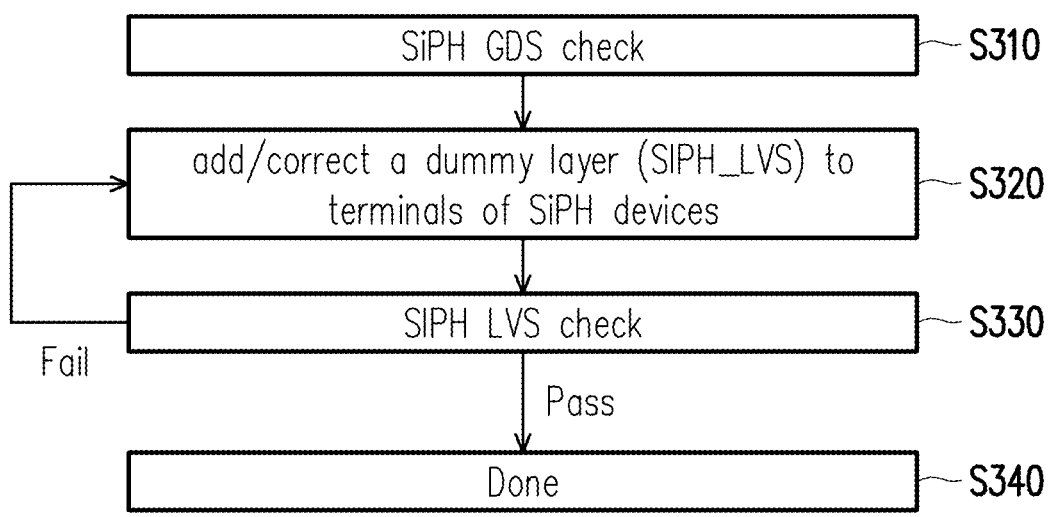
FIG. 3 is a flowchart of a method for performing verification of an optical die having SiPH devices in accordance with some embodiments.

FIG. 3 illustrates a flowchart of a method for performing verification of an optical die having SiPH devices in accordance with some embodiments. In step S310, a SiPH graphic database system (GDS) check is performed to verify the SiPH devices in the optical die (e.g., O-die 120 of FIG. 1). The SiPH GDS check may be performed based on GDS files that include a layout representation and a textual representation of each SiPH device. In some embodiments, the SiPH GDS check includes analysis of the layout representations or the textual representations of the SiPH devices of the optical die. In some embodiments, the SiPH GDS check includes analysis of both the layout representations and the textual representations of the SiPH devices of the optical die. In some embodiments, the SiPH GDS check may determine whether the layout representations and/or the textual representations of the SiPH devices in the optical die is corrected.

In step S320, a dummy layer SIPH_LVS is added to at least one terminal of the SiPH devices included in the optical die. In some embodiments, the dummy layer SIPH_LVS is added to selected terminals of the SiPH devices. In some embodiments, the dummy layer SIPH_LVS is added to every terminal of the SiPH devices. The verification of the optical die is performed based on the dummy layer SIPH_LVS that is added to the terminals of the SiPH devices. In some embodiments, the dummy layer SIPH_LVS and a dummy layer text (also referred to as text SIPH_LVS_text) may be added to at least one terminal of the SiPH devices in the optical die to perform the verification of the optical die.

In step S330, a layout versus schematic (LVS) check is performed to verify the connection and routing quality of the SiPH device included in the optical die. The LVS check may compare the layout of the optical die including the SiPH devices with a schematic of the optical die. The LVS check may help to ensure that the layout of the optical die is capable of performing the same functionality as the schematic diagram of the optical die. In some embodiments, the LVS check may help to ensure that the electrical connection and routing of the SiPH devices in the optical die are correct. A tool used to perform the LVS check is not limited to a particular tool. In some embodiments, the LVS check may be performed using Calibre by Mentor Graphics, Quartz LVS by Magma Design Automation, IC Validator by Synopsys or another suitable LVS tool.

In some embodiments, a design rules check (DRC) of the GDS file may be performed to compare the layout of the GDS file with manufacturing capabilities of a process used to form the SiPH devices. In some embodiments, the DRC check includes determining whether the elements of the GDS file have sufficient spacing to account for manufacturing error during formation of the SiPH devices.

If the optical die including the dummy layer SIPH_LVS passes the LVS check, as indicated by "Pass" in FIG. 3, the verification is done at step S340. If the verification fails, as indicated by "Fail" in FIG. 3, it returns to the step S320 to correct a location of the dummy layer SIPH_LVS added to the terminals of the SiPH devices. In some embodiments, the verification is failed if the layout of the optical die including the SiPH devices does not perform the same functionality of the schematic diagram of optical die. The inclusion of the dummy layer SIPH_LVS to the layout of the optical die may help to improve significantly the accuracy and efficiency for verification of the optical die. Accordingly, the amount of time to perform verification of the optical die including SiPH devices is reduced.

Figure 4A:
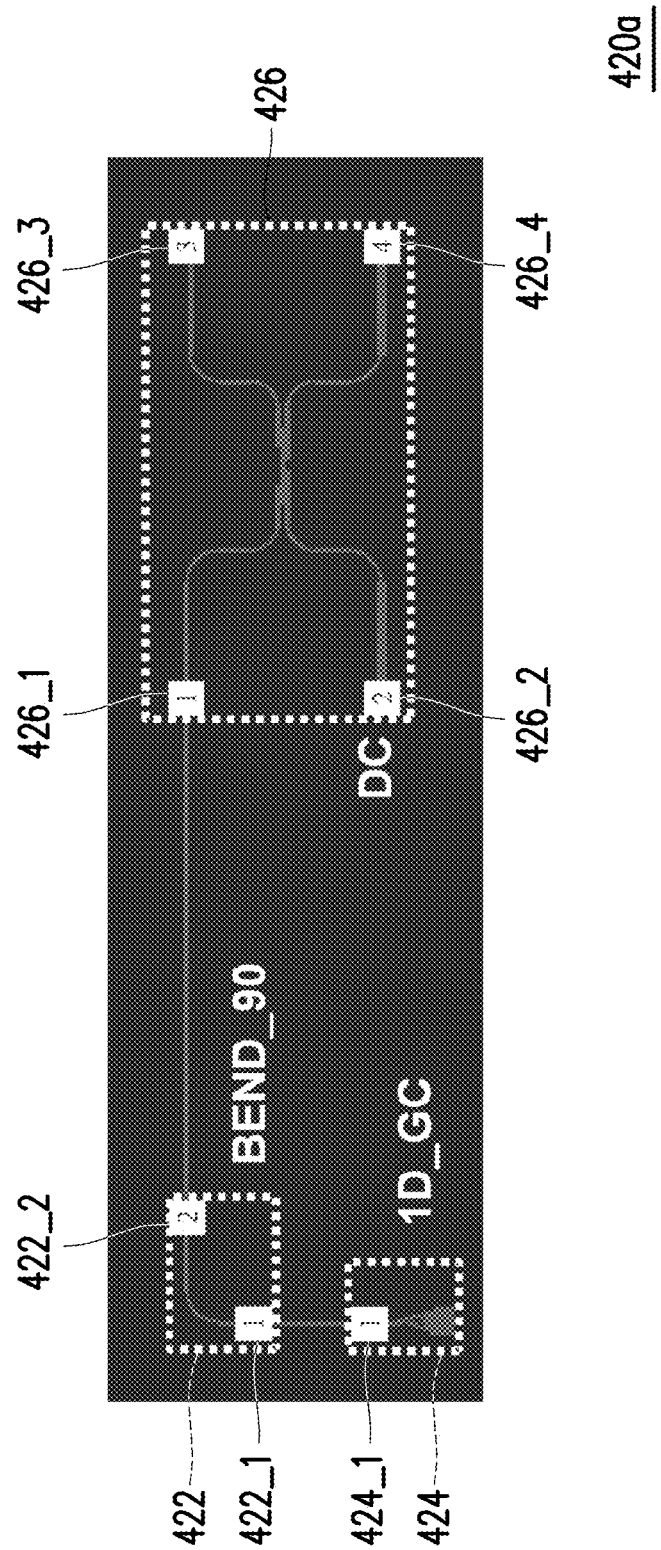
FIGS. 4A through 4B are views of layouts of an optical die having a SiPH dummy layer in accordance with some embodiments.

FIG. 4A illustrates a view of a layout of an optical die 420a having a dummy layer SIPH_LVS and a dummy layer text SIPH_LVS_text in accordance with some embodiments. The optical die 420a may include SiPH devices 422, 424 and 426. Each of the SiPH devices 422, 424, 426 is represented by a layout representation and a textual representation. For example, the textual representations of the SiPH devices 422, 424, 426 are "BEND_90", "1D_GC" and "DC", respectively.

In some embodiments, the dummy layer SIPH_LVS and the dummy layer text SIPH_LVS_text are added to every terminal of the SiPH devices 422, 424 and 426. For example, the SiPH device 422 has two terminals 422_1 and 422_2; the SiPH device 424 has only one terminal 424_1; and the SiPH device 426 has four terminals 4261 through 426_4. The dummy layer SIPH_LVS and the dummy layer text SIPH_LVS_text are added to the terminals 422_1 and 422_2 of the SiPH device 422, to the terminal 424_1 of the SiPH device 424 and to the terminals 426_1 through 426_4 of the SiPH device 426. In FIG. 4A, the addition of the dummy layer SIPH_LVS to the terminals of the SiPH devices 422, 424 and 426 are illustrated by the inclusion of a square on each terminal of the SiPH devices 422, 424 and 426. The addition of the dummy layer text SIPH_LVS_text is represented by text of "1", "2", "3", "4" on the terminals of the SiPH devices 422, 424 and 426. In some embodiments, a dummy layer SIPH_LVS added to the layout of the optical die 420a may be used to perform the verification of the optical die 420a.

Figure 4B:
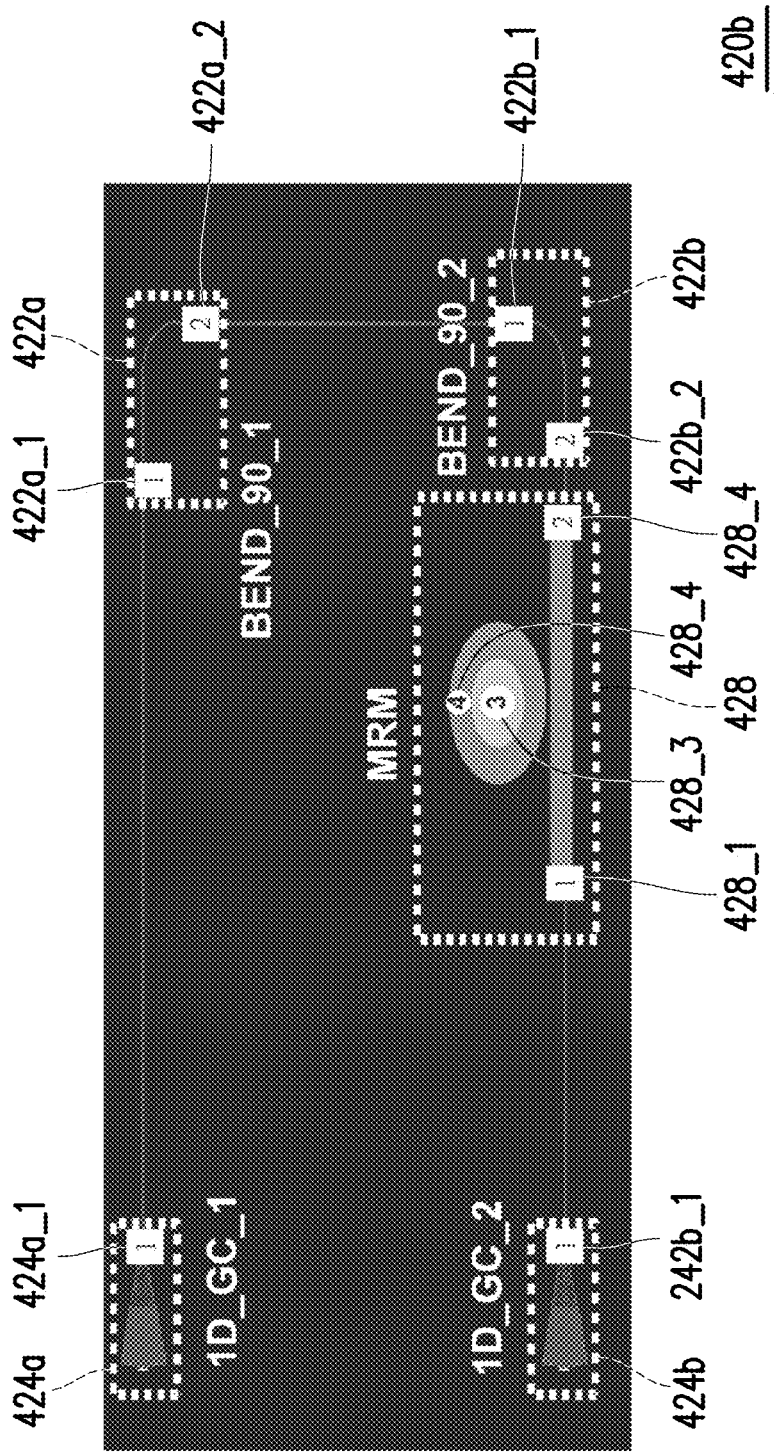

FIG. 4B illustrates a view of a layout of an optical die 420b having a dummy layer SIPH_LVS and a dummy layer text SIPH_LVS_text in accordance with some embodiments. The optical die 420b may include SiPH devices 422a, 422b, 424a, 424b and 428, in which the SiPH device 422a is of the same type as the SiPH device 422b and SiPH devices 424a is of the same type as the SiPH device 424b. For example, both the SiPH devices 422a and 422b are 90-degree bending devices; and both the SiPH devices 424a and 424b are grating couplers.

In some embodiments, the textual representations of same-type SiPH devices may include an index value for distinguishing the same-type SiPH devices. As the example shown in FIG. 4B, the textual representation of the SiPH device 422a is "BEND_90_1" and the textual representation of the SiPH device 422b is "BEND_90_2". Similarly, the textual representation of the SiPH device 424a is "1D_GC_1" and the textual representation of the SiPH device 424b is "1D_GC_2". In some embodiments, the textual representations or the name of the SiPH devices in the layout of the optical die may be determined based on a parameterized cell base.

In some embodiments, the dummy layer SIPH_LVS and the dummy layer text SIPH_LVS_text are added to every terminal of the SiPH devices 422a, 422b, 424a, 424b and 428. As shown in FIG. 4B, the dummy layer SIPH_LVS and the dummy text layer SIPH_LVS_text are added to the terminals 422a_1, 422a_2 of the SiPH device 422a, to the terminals 422b_1, 422b_2 of the SiPH device 422b, to the terminal 424a_1 of the SiPH device 424a, to terminal 424b_1 of the SiPH device 424b, and to terminals 428_1 through 428_4 of the SiPH device 428.

In some embodiments, a shape and a size of the dummy layer to be added to a specific terminal of a SiPH device may vary based on a shape and a size of the specific terminal. For example, the dummy layer added to the terminals 428_3 and 428_4 of the SiPH device 428 is represented as circles while the dummy layer added to the terminals 428_1 and 428_2 of the SiPH device 428 is represented as squares. In addition, a size of the dummy layer added to the terminal 428_3 of the SiPH device 428 may be different from a size of the dummy layer added to the terminal 428_4 of the SiPH device 428. In some embodiments, the size, shape and location of the dummy layer are determined based on a parameterized base cell.

Figure 5:
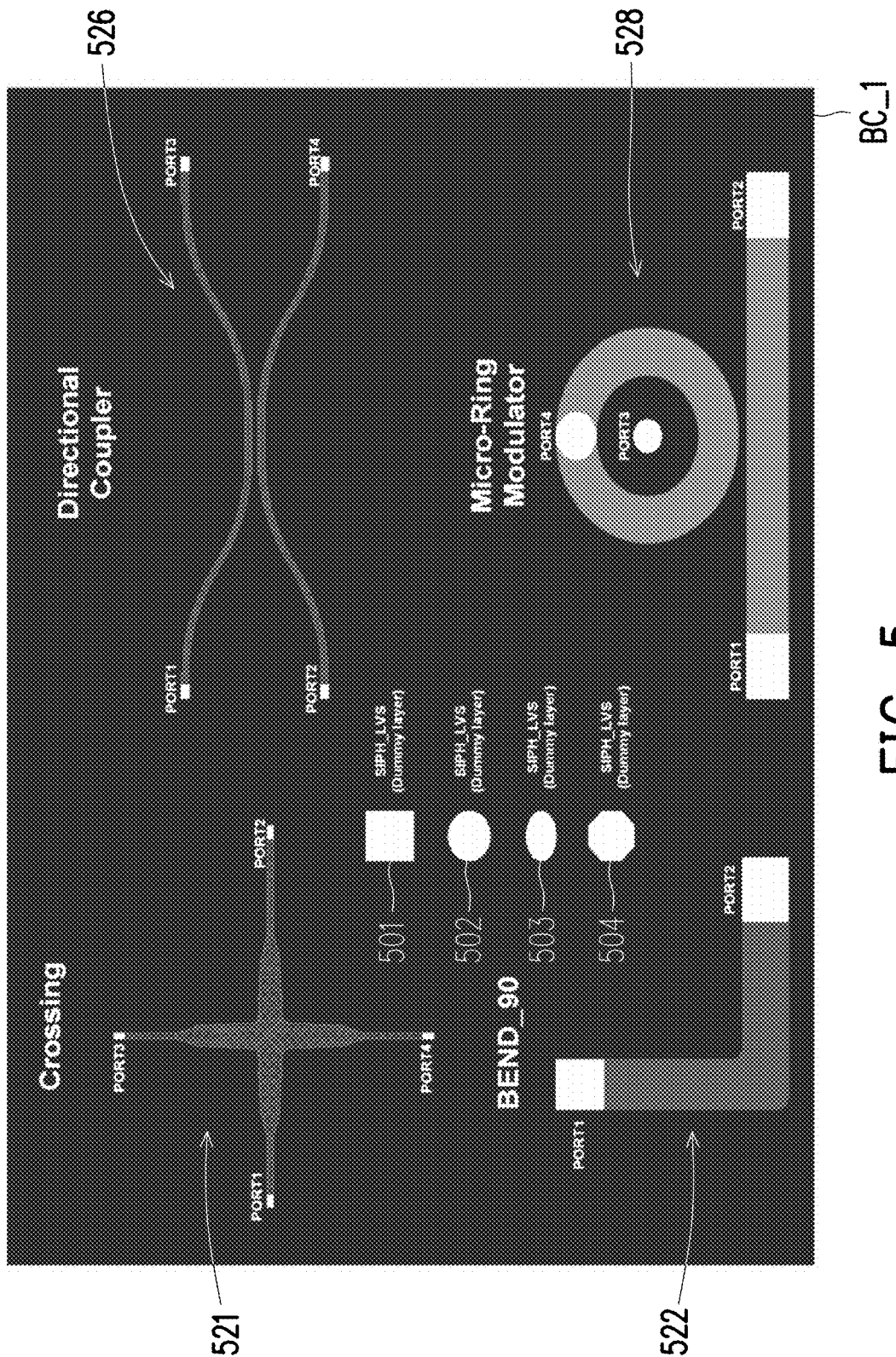
FIG. 5 is a view of a parameterized cell base in accordance with some embodiments.

FIG. 5 is a view of a parameterized cell base BC_1 in accordance with some embodiments. The parameterized cell base BC_1 may be used to generate the dummy layer SIPH_LVS and/or dummy layer text SIPH_LVS_text for general SiPH devices such as a bending device 522, a micro-ring modulator 528, a directional coupler 526 and a crossing device 521, or any other suitable devices. The parameterized cell base BC_1 may be used to determine a shape, a size and a location of the dummy layer added to terminals of a SiPH device. In some embodiments, the parameterized cell base BC_1 is used to determine the shape and the size of the dummy layer SIPH_LVS added to a specific terminal of the SiPH device based on the shape and the size of the specific terminal of the SiPH device. For example, the shape of the dummy layer SIPH_LVS added to the terminals of the SiPH device may be one of a square 501, a circle 502, an ellipse 503 an octagon 504, or any other shapes. In addition, the parameterized cell base BC_1 may be used to determine the dummy layer location for terminals of the SiPH device based on the relative locations (e.g., left, right, top, and center) of the terminals of the SiPH device.

In some embodiments, the parameterized cell base BC_1 may be used to determine the textual representation of the SiPH devices (e.g., name of the SiPH devices). In some embodiments, the parameterized cell base BC_1 may be used to determine the textual representation of the SiPH devices based on a GDS file of the SiPH devices. When there are multiple SiPH devices of the same type, the parameterized cell base BC_1 may be used to adjust the textual representation of the same-type SiPH devices. For example, if there are two 90-degree bending devices are included in the optical die, the textual representations of two 90-degree bending devices may be "BEND_90_1" and "BEND_90_2" as shown in FIG. 4B.

In some embodiments, the parameterized cell base BC_1 may be used to generate the dummy layer SIPH_LVS for the SiPH devices based on a set of parameters. For example, a first set of parameters may be used to generate the dummy layer SIPH_LVS for the SiPH device 521; a second set of parameters may be used to generate the dummy layer SIPH_LVS for the SiPH device 522; a third set of parameters may be used to generate the dummy layer SIPH_LVS for the SiPH device 526; and a fourth set of parameters may be used to generate the dummy layer SIPH_LVS for the SiPH device 528. For example, a set of parameters for the parameterized cell base BC_1 may include at least one of a shape parameter, a size parameter, a location parameter, and a SiPH device textual representation parameter.

In some embodiments, the parameterized cell base BC_1 may be used to generate the dummy layer SIPH_LVS for the SiPH devices 521, 522, 524 and 528 based on the following codes:

DEVICE BEND_90 PORT1(TOP) PORT2(BOTTOM) <BEND_90_W><BEND_90_R>;

DEVICE MRM PORT1(LEFT) PORT2(RIGHT) PORT3(CENTER) PORT4(TOP) <MRM_R><MRM_L><MRM_G>;

DEVICE DIRECTIONAL_COUPLER PORT1(LEFT_TOP) PORT2(LEFT_BOTTOM) PORT3(RIGHT_TOP) PORT4(RIGHT_BOTTOM) <DC_W><DC_L><DC_G>;

DEVICE crossing PORT1(LEFT) PORT2(RIGHT) PORT3(TOP) PORT4(BOTTOM) <CROSSING_W><CROSSING_L>.

Figure 6B:
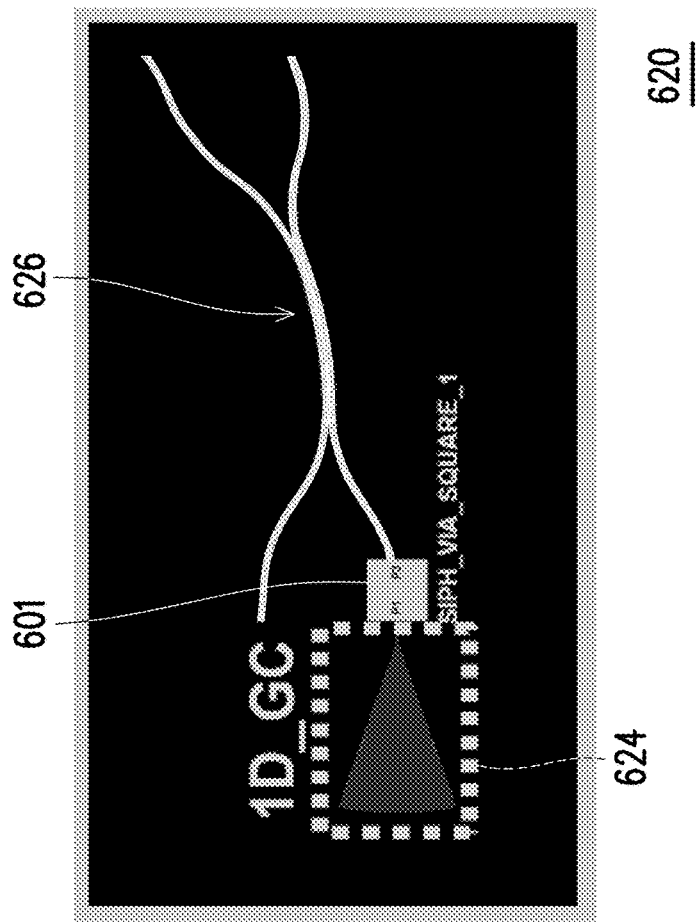
FIG. 6B is a view of a layout of an optical die having a customized SiPH device in accordance with some embodiments.
Figure 6A:
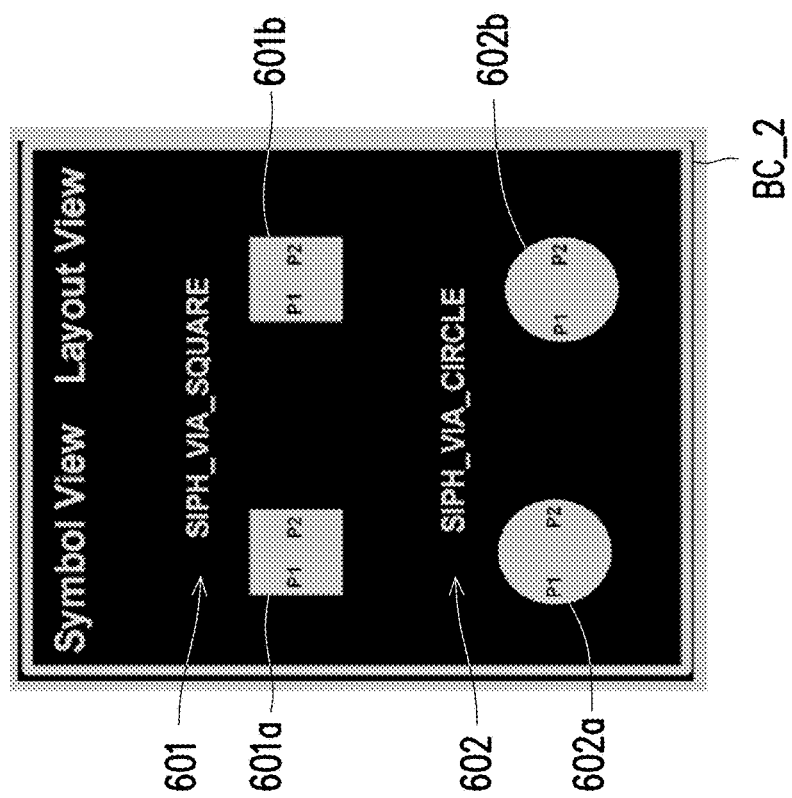
FIG. 6A is a view of a parameterized cell base in accordance with some embodiments.

FIG. 6A is a view of a parameterized cell base BC_2 in accordance with some embodiments. The parameterized cell base BC_2 may be used to generate a dummy layer SIPH_LVS for verifying customized SiPH devices. In some embodiments, the parameterized cell base BC_2 may be used to add a dummy layer to a connecting device that is connected to the customized SiPH devices. The parameterized cell base BC_2 may include a symbol-layout component (SIPH_VIA) that defines a symbol view and a layout view for different connecting devices. FIG. 6A illustrates the symbol-layout components of connecting devices 601 and 602. The symbol-layout component of the connecting device 601 includes the symbol view 601*a* and a layout view 601*b*; and the symbol-layout component of the connecting device 602 includes the symbol view 602*a* and a layout view 602*b*. In some embodiments, the symbol view may indicate the symbol information of the connecting devices 601 and 602; and the layout view may indicate the layout information of the connecting devices 601 and 602. For example, the symbol view 601*a* of the connecting device 601 may include the symbols "P1" and "P2"; and the layout view 601*b* of the connecting device 601 may be represented by a square with the symbols "P1" and "P2" located at the left and right positions of the square. The symbol view 602*a* of the connecting device 602 may include the symbols "P1" and "P2"; and the layout view 602*b* of the connecting device 602 may be represented by a circle with the symbols "P1" and "P2" located at the left and right positions of the circle.

In some embodiments, the connecting devices 601 and 602 shown in FIG. 6A may be generated based the following codes:

DEVICE SIPH_VIA_SQUARE PORT1(LEFT) PORT2(RIGHT)<SIPH_VIA_SQUARE_W><SIPH_VIA_SQUARE_L>;

DEVICE SIPH_VIA_CIRCLE PORT1(LEFT) PORT2(RIGHT) <SIPH_VIA_CIRCLE_W><SIPH_VIA_CIRCLE_L>.

In some embodiments, the parameterized cell base BC_2 may also define the names for different connecting devices (e.g., SIPH_VIA_SQUARE" and "SIPH_VIA_CIRCLE").

FIG. 6B is a view of a layout of an optical die 620 having a customized SiPH device 626 in accordance with some embodiments. The dummy layer is added to the location of a connecting device 601 that is connected between the SiPH device 624 and the customized SiPH device 626. In some embodiments, the dummy layer added to the connecting device 601 may be generated by a parameterized cell base (e.g., parameterized cell base BC_2 in FIG. 6A). In some embodiments, the verification of an integrated circuit having general SiPH devices and customized SiPH devices may be performed based on the inclusion of the dummy layer SIPH_LVS.

FIG. 7A is a flowchart of a method for performing verification of an integrated circuit stack (e.g., integrated circuit stack 100 in FIG. 1) in accordance with some embodiments. In step S710, a GDS check is performed to verify the layout representations or the textual representations of the devices of the electronic die (i.e. E-die). In some embodiments, the GDS check may determine whether the layout representations and/or the textual representations of the devices in the electronic die are corrected.

Figure 8A:
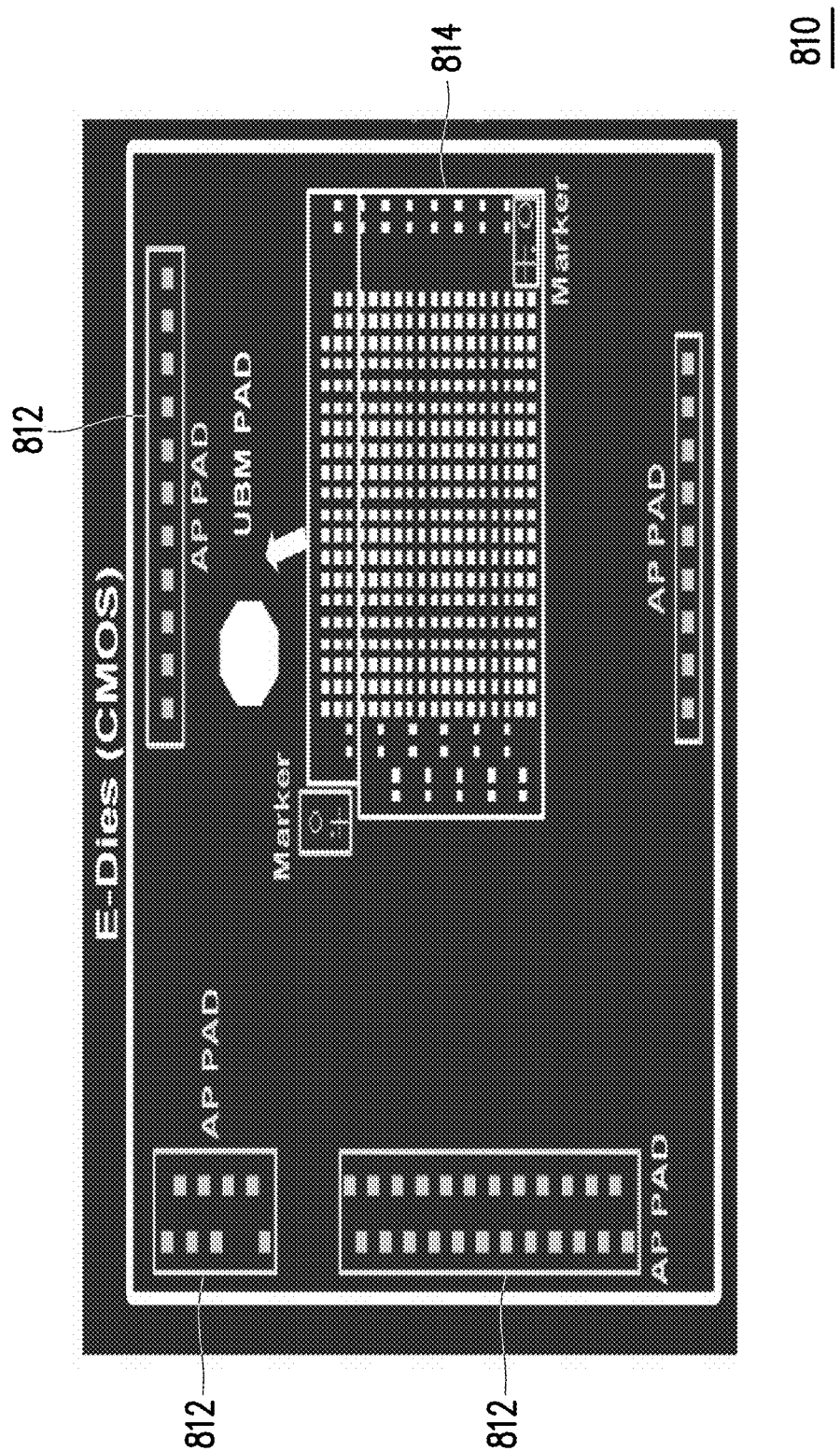
FIG. 8A is a view of a layout of an electronic die in accordance with some embodiments.

Referring to FIG. 8A, a view of a layout of an electronic die 810 is illustrated in accordance with some embodiments. The layout of the electronic die 810 may include AP pads 812 and contact pads 814, in which contact pads 814 are configured to be electrically coupled to the optical die. In some embodiments, makers are added to the layout of the electronic die to indicate the regions of the contact pads 814 of the electronic die. The GDS check may check the layout representation and textual representation of the device in the electronic die 810.

Returning to FIG. 7, in step S720, a schematic diagram of contact pads of the electronic die and/or the optical die (i.e. O-die) is built up. Referring to FIG. 8B, a schematic diagram 840 of the contact pads of the electronic die is illustrated in accordance with some embodiments. The schematic diagram 840 may represent the schematic of the contact pads and electrical connections thereof. In some embodiments, the schematic diagram of contact pads of the optical die is also built up to represent the schematic of contact pads and electrical connections thereof. In some embodiments, a step of verifying the schematic diagram of contact pads of the electronic die and the schematic diagram of contact pads of the optical die is also performed to ensure that the stack of the electronic die and the optical die may have desired functionalities.

Figure 8B:
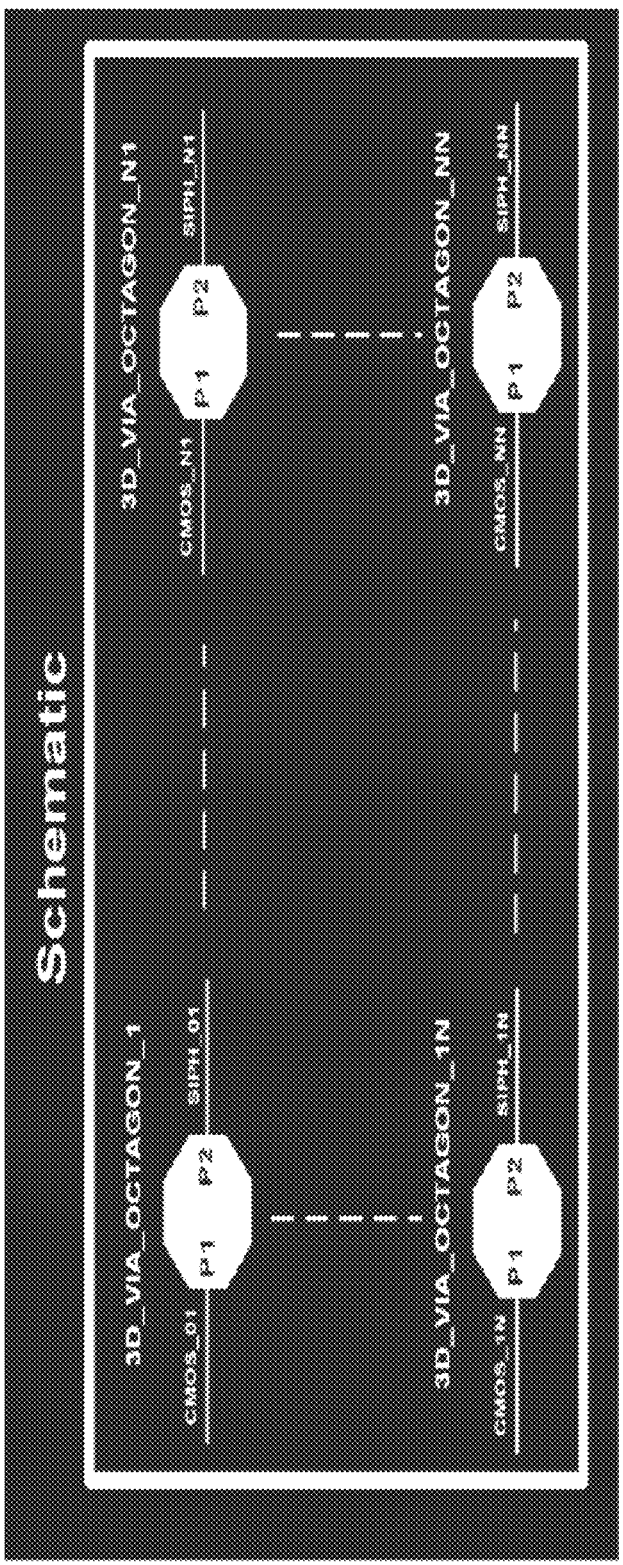
FIG. 8B is a view of a schematic diagram of an electronic die in accordance with some embodiments.
Figure 8C:
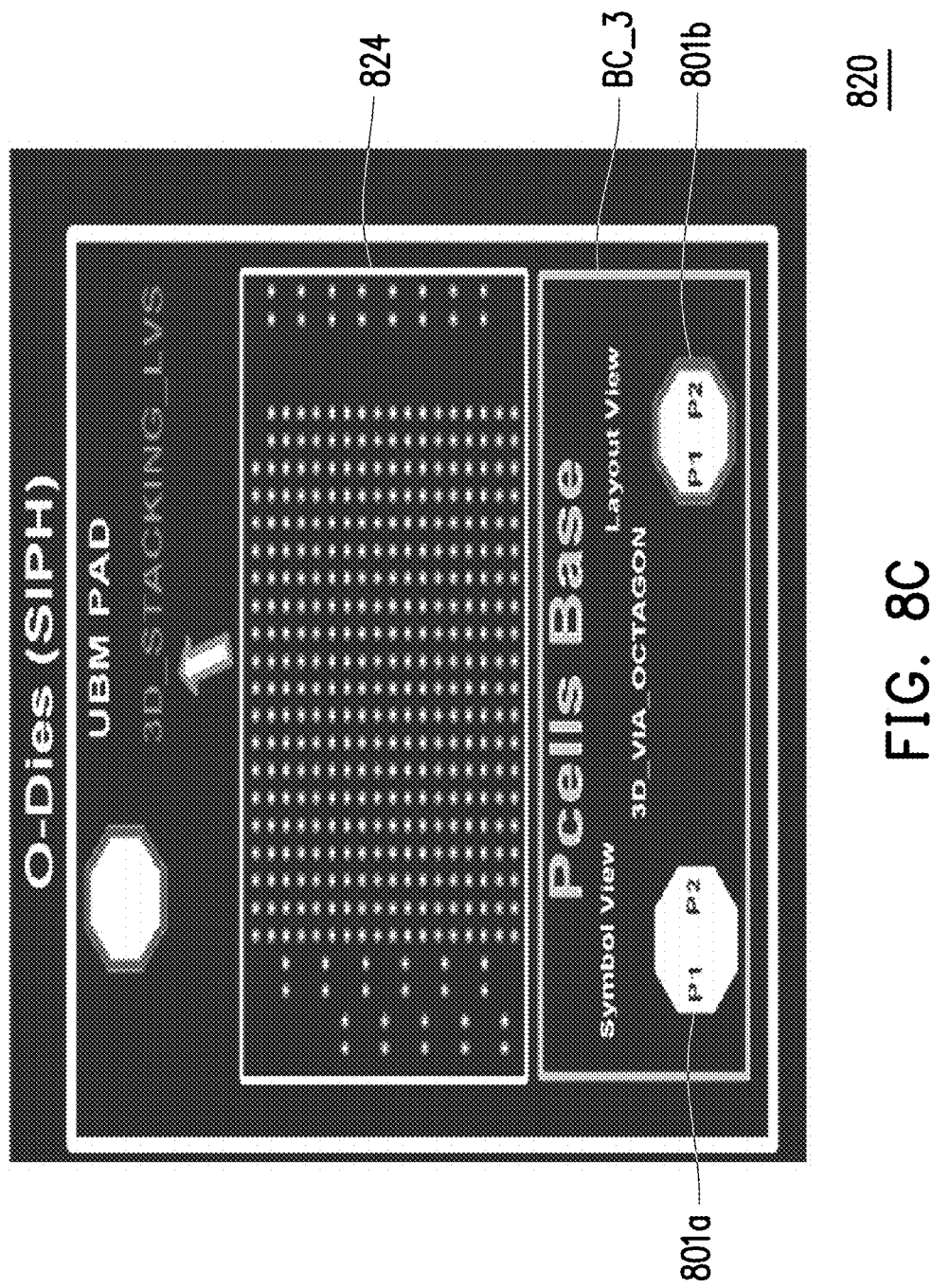
FIG. 8C is a view of a layout of an optical die in accordance with some embodiments.

In step S730, locations of the contact pads of the electronic die (e.g., E-die 110 in FIG. 1) is converted to the optical die. Referring to FIG. 8C, the locations of the contact pads 814 of the electronic die is converted into the optical die and is represented as the converted contact pads 824 in the optical die. In other words, the locations of the converted contact pads 824 in the optical die is determined based on the locations of the contact pads 814 in the electronic die.

FIG. 8C further illustrates a parameterized cell base BC_3 that may be used to generate a dummy layer SIPH_LVS that is used to verify the SiPH devices in the optical die. In some embodiments, both verification processes for SiPH devices connections in the optical die and stacking quality of the electronic die and the optical die may be performed.

In step S740, a dummy layer 3D_STACKING_LVS is added to the contact pads of the optical die. In some embodiments, the dummy layer 3D_STACKING_LVS is added to selected contact pads of the optical die. In some alternative embodiments, the dummy layer 3D_STACKING_LVS may be added to all contact pad of the optical die.

In step S750, a LVS check is performed on the optical die to verify the stacking of the electronic die and the optical die. In some embodiments, the LVS check on the optical die includes determining whether the locations of the converted contact pads of the electronic die on the optical die are aligned with the packaging dummy layer (3D_STACKING_LVS). In some embodiments, the LVS check may include determining whether the layout of the electronic die has the functionalities of the schematic diagram of the electronic die. The LVS check may include determining whether the layout of the optical die has the functionalities of the schematic diagram of the optical die. The LVS check may include determining whether the layout of the integrated circuit stack (stack of the optical die and the electronic die) has the functionalities of the schematic diagram of the integrated circuit stack.

Figure 7:
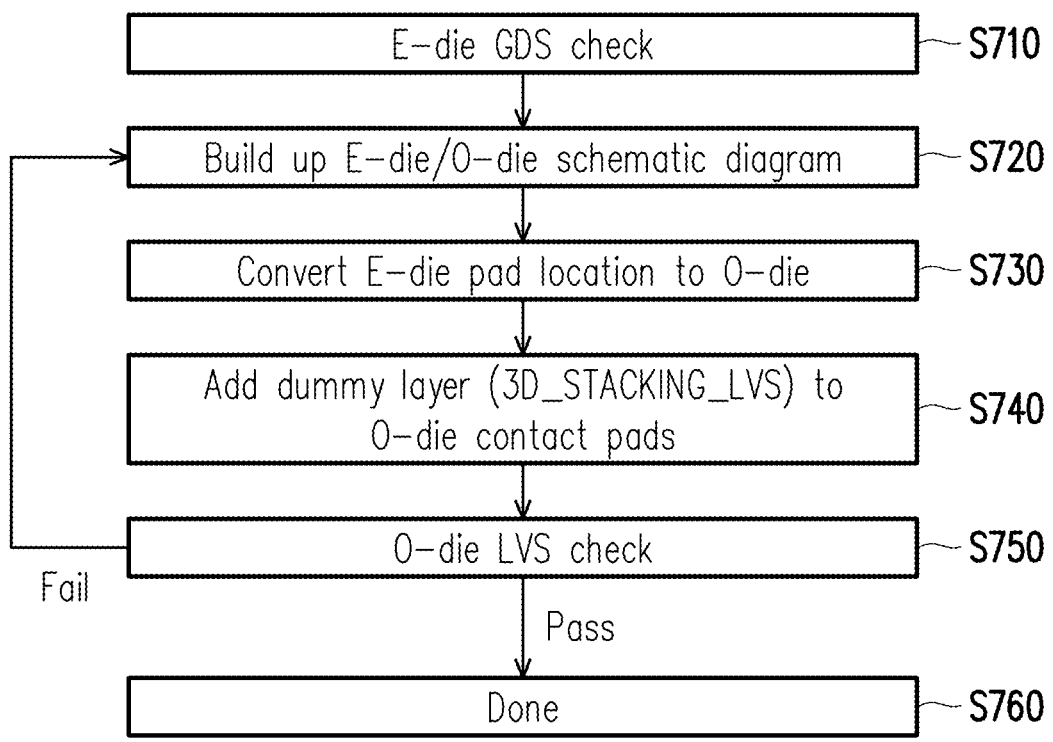
FIG. 7 is a flowchart of a method for performing verification of an integrated circuit stack in accordance with some embodiments.

If the integrated circuit stack passes the LVS check, as indicated by "Pass" in FIG. 7, the verification process is done at step S760. If the verification process fails, as indicated by "Fail" in FIG. 7, the verification process returns to the step S720 to check and correct the schematic diagrams of the electronic die and/or the optical die. In some embodiment, if the verification process fails, the verification process may return to the step S740 to check and correct the addition of the packaging dummy layer.

Figure 9:
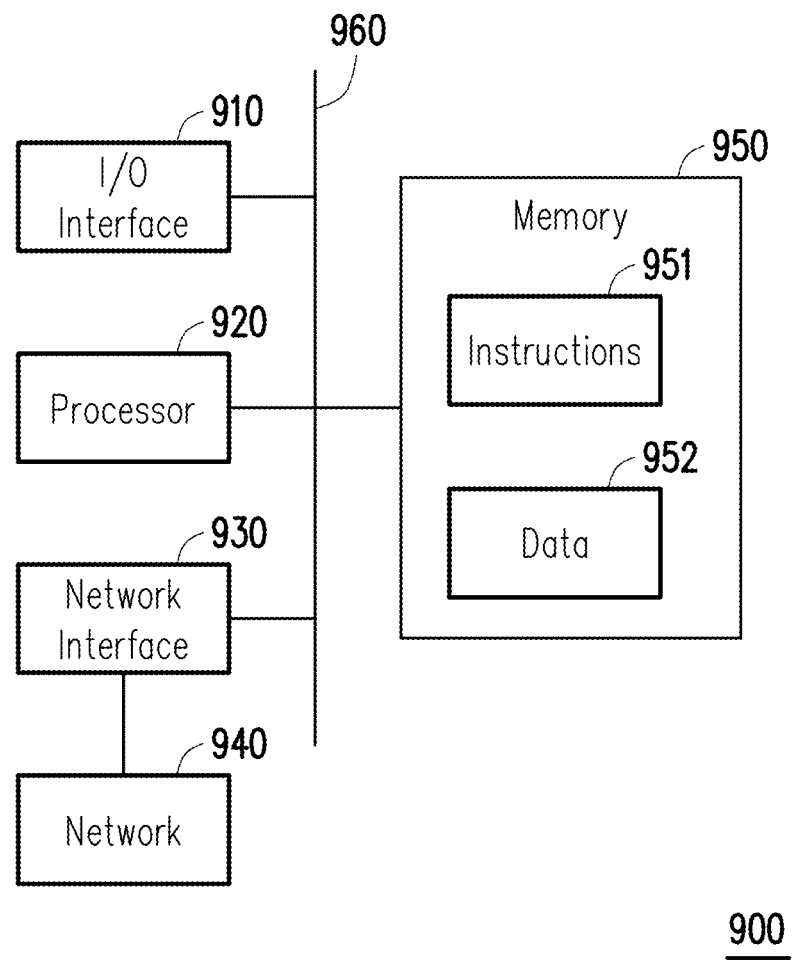
FIG. 9 is a block diagram of a system for performing verification of an integrated circuit stack in accordance with some embodiments.

FIG. 9 is a block diagram of a system 900 for performing verification of an integrated circuit stack in accordance with some embodiments. The system 900 may include an I/O interface 910, a processor 920, a network interface 930, and a memory 950. The I/O interface 910 may be coupled to external circuitry. In some embodiments, I/O interface 910 includes a keyboard, keypad, mouse, trackball, trackpad, and/or cursor direction keys for communicating information and commands to processor 920.

The memory 950 may store computer instructions 951 that are configured to cause system 900 to perform the verification of the integrated circuit stack. In some embodiments, the memory 950 also stores data 952 needed for performing the verification and parameters 953 needed during the verification.

The processor 920 is coupled to the I/O interface 910, the network interface 930 and the memory 950 through a bus 960. The processor 920 may communicate with an external network 940 through the network interface 930. In addition, the processor 920 may access the instructions and data stored in the memory 950 through the bus 960. In some embodiments, the processor 920 is configured to execute the instructions stored in the memory 960 to perform various operations for verifying the integrated circuit stack.

Figure 10:
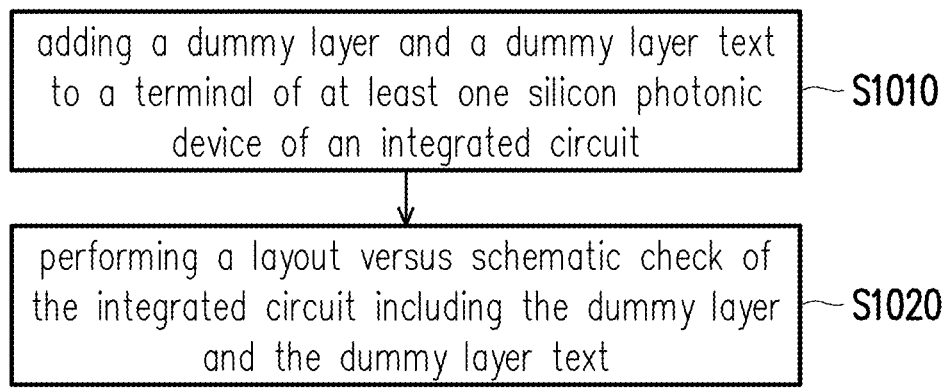
FIG. 10 is a flowchart of a method for verifying an integrated circuit stack in accordance with some embodiments.

FIG. 10 is a flowchart of a method for verifying an integrated circuit stack in accordance with some embodiments. In step S1010, a dummy layer and a dummy layer text are added to a terminal of at least one silicon photonic device of an integrated circuit. In some embodiments, the dummy layer and the dummy layer text are added to selected terminals of at least one silicon photonic device. In some other embodiments, the dummy layer and the dummy layer text are added to every terminal of at least one silicon photonic device.

In step S1020, a layout versus schematic check of the integrated circuit including the dummy layer and the dummy layer text is performed. In some embodiments, the layout versus schematic check determines whether a layout of the integrated circuit has a same functionality as a schematic of the integrated circuit.

Figure 11:
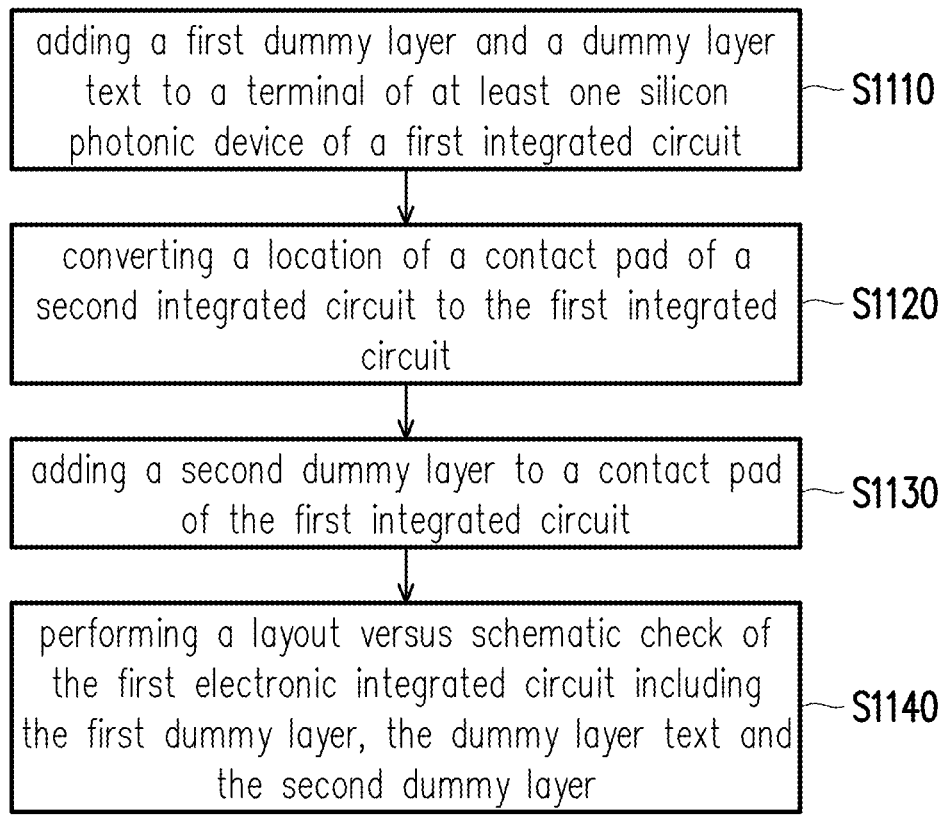
FIG. 11 is a flowchart of a method for verifying an integrated circuit stack in accordance with some alternative embodiments.

FIG. 11 is a flowchart of a method for verifying an integrated circuit stack in accordance with some embodiments. In step S1110, a first dummy layer and a dummy layer text are added to a terminal of at least one silicon photonic device of a first integrated circuit.

In step S1120, a location of a contact pad of a second integrated circuit is converted to the first integrated circuit.

In step S1130, a second dummy layer is added to a contact pad of the first integrated circuit. In some embodiments, the second dummy layer is added to every contact pad of the first integrated circuit.

In step S1140, a layout versus schematic check is performed on the first electronic integrated circuit including the first dummy layer, the dummy layer text and the second dummy layer. In some embodiments, it is determined whether a layout of the integrated circuit stack has a same functionality as a schematic of the integrated circuit stack.

In accordance with some embodiments, a dummy layer SIPH_LVS and a dummy layer text SIPH_LVS_text are added to terminals of SiPH devices of an optical die to perform verification on the connection and routing of the SiPH devices in the optical die. A single dummy layer SIPH_LVS may be enough to perform the verification of general SiPH devices as well as customized SiPH device in the optical die. In addition, a dummy layer 3D_STACKING_LVS may be added to contact pads of at least one of an electronic die and an optical die to verify the stacking quality of the electronic die and the optical die. The verification of the connection and routing quality of the SiPH devices and the stacking quality of the electronic die and the optical die may be performed on a combination of the dummy layer SIPH_LVS and the dummy layer 3D_STACKING_LVS.

In accordance with some embodiments, a method of verifying an integrated circuit stack of a first integrated circuit and a second integrated circuit, the first integrated circuit comprising a silicon photonic (SIPH) device is introduced. The method comprises steps of adding a single first dummy layer to at least one terminal of the SIPH device in a first layout of the first integrated circuit, wherein a shape of the single first dummy layer added to the at least one terminal of the SIPH device maps a shape of the at least one terminal of the SIPH device, and performing a first layout versus schematic (LVS) check on the first integrated circuit based on the single first dummy layer added to the at least one terminal of the SIPH device to verify a connection of the SIPH device in the first integrated circuit.

In accordance with some embodiments, a method of verifying an integrated circuit stack of a first integrated circuit and a second integrated circuit is introduced, in which the first integrated circuit comprising a silicon photonic (SIPH) device and the second integrated circuit comprising second contact pads. The method comprises steps of adding a single first dummy layer to at least one terminal of the SIPH device in a first layout of the first integrated circuit, wherein a shape of the single first dummy layer added to the at least one terminal of the SIPH device maps a shape of the at least one terminal of the SIPH device; performing a first LVS check on the first integrated circuit based on the single first dummy layer added to the at least one terminal of the SIPH device to verify a connection of the SIPH device in the first integrated circuit; converting locations of the second contact pads of the second integrated circuit to a first layout the first integrated circuit to generate converted contact pads in the first layout of the first integrated circuit; adding a second dummy layer to at least one of the at least one terminal of the SIPH device in the first layout of the first integrated circuit or the converted contact pads in the first layout of the first integrated circuit; and performing a second LVS check on the integrated circuit stack including the first integrated circuit and the second integrated circuit based on the second dummy layer to verify the integrated circuit stack.

In accordance with some embodiments, a system for verifying an integrated circuit stack of a first integrated circuit and a second integrated circuit is introduced. The first integrated circuit comprising a silicon photonic (SIPH) device and the second integrated circuit comprising second contact pads. The system includes a non-transitory computer readable medium and a processor. The non-transitory computer readable medium is configured to store instructions. The processor is connected to the non-transitory computer readable medium, and configured to execute the stored instructions. The processor is configured to add a single first dummy layer to at least one terminal of the SIPH device in a first layout of the first integrated circuit, wherein a shape of the single first dummy layer added to the at least one terminal of the SIPH device maps a shape of the at least one terminal of the SIPH device. The processor is further configured to perform a first LVS check on the first integrated circuit based on the single first dummy layer added to the at least one terminal of the SIPH device to verify a connection of the SIPH device in the first integrated circuit. The processor is further configured to convert locations of the second contact pads of the second integrated circuit to the first layout the first integrated circuit to generate converted contact pads in the first layout of the first integrated circuit. The processor is further configured to add a second dummy layer to at least one of the at least one terminal of the SIPH device in the first layout of the first integrated circuit or the converted contact pads in the first layout of the first integrated circuit. The processor is further configured to perform a second LVS check on the integrated circuit stack including the first integrated circuit and the second integrated circuit based on the second dummy layer to verify the integrated circuit stack.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method of verifying an integrated circuit stack of a first integrated circuit and a second integrated circuit, the first integrated circuit comprising a silicon photonic (SIPH) device, the method comprising:
    adding a single first dummy layer to at least one terminal of the SIPH device in a first layout of the first integrated circuit, wherein a shape of the single first dummy layer added to each of the at least one terminal of the SIPH device is same as a shape of a respective terminal of the at least one terminal of the SIPH device; and
    performing a first layout versus schematic (LVS) check on the first integrated circuit based on the single first dummy layer added to the each of the at least one terminal of the SIPH device to verify a connection of the SIPH device in the first integrated circuit.

2. The method of claim 1, wherein the single first dummy layer only covers the at least one terminal of the SIPH device without covering an entire area of the SIPH device in the first layout of the first integrated circuit.

3. The method of claim 1, wherein adding the single first dummy layer to the at least one terminal of the SIPH device in the first layout of the first integrated circuit comprises:
    adding the single first dummy layer to every terminal of the SIPH device in the first layout of the first integrated circuit.

4. The method of claim 1, wherein the second integrated circuit comprises contact pads, and the method further comprising:
    converting locations of the contact pads of the second integrated circuit to the first layout of the first integrated circuit to generate converted contact pads in the first layout of the first integrated circuit;
    adding a second dummy layer to at least one of the at least one terminal of the SIPH device in the first layout of the first integrated circuit or the converted contact pads in the first layout of the first integrated circuit; and
    performing a second LVS check on the integrated circuit stack including the first integrated circuit and the second integrated circuit based on the second dummy layer to verify the integrated circuit stack.

5. The method of claim 4, wherein performing the second LVS check of the integrated circuit stack comprises:
    determining whether a layout of the integrated circuit stack has a same functionality as a schematic of the integrated circuit stack.

6. The method of claim 5, further comprising:
    adjusting a location of the second dummy layer or adjusting schematics of the first integrated circuit and the second integrated circuit if the second LVS check fails.

7. The method of claim 4, wherein adding the second dummy layer to the at least one terminal of the SIPH device in the first layout of the first integrated circuit or the converted contact pads in the first layout of the first integrated circuit comprises:
    adding the second dummy layer to every terminal of the SIPH device and every converted contact pad in the first layout of the first integrated circuit.

8. The method of claim 1, wherein the single first dummy layer is generated based on a parameterized cell base which defines at least one of a name of the SIPH device, a shape of the single first dummy layer, a size of the single first dummy layer and a location of the single first dummy layer.

9. A method of verifying an integrated circuit stack of a first integrated circuit and a second integrated circuit, the first integrated circuit comprising a silicon photonic (SIPH) device and the second integrated circuit comprising second contact pads, the method comprising:
    adding a single first dummy layer to at least one terminal of the SIPH device in a first layout of the first integrated circuit, wherein a shape of the single first dummy layer added to the at least one terminal of the SIPH device maps a shape of the at least one terminal of the SIPH device;
    performing a first layout versus schematic (LVS) check on the first integrated circuit based on the single first dummy layer added to the at least one terminal of the SIPH device to verify a connection of the SIPH device in the first integrated circuit;
    converting locations of the second contact pads of the second integrated circuit to a first layout the first integrated circuit to generate converted contact pads in the first layout of the first integrated circuit;
    adding a second dummy layer to at least one of the at least one terminal of the SIPH device in the first layout of the first integrated circuit or the converted contact pads in the first layout of the first integrated circuit; and
    performing a second LVS check on the integrated circuit stack including the first integrated circuit and the second integrated circuit based on the second dummy layer to verify the integrated circuit stack.

10. The method of claim 9, wherein the single first dummy layer only covers the at least one terminal of the SIPH device without covering an entire area of the SIPH device in the first layout of the first integrated circuit.

11. The method of claim 9, wherein adding the single first dummy layer to the at least one terminal of the SIPH device in the first layout of the first integrated circuit comprises:
   adding the single first dummy layer to every terminal of the SIPH device in the first layout of the first integrated circuit.

12. The method of claim 9, wherein performing the second LVS check of the integrated circuit stack comprises:
   determining whether a layout of the integrated circuit stack has a same functionality as a schematic of the integrated circuit stack.

13. The method of claim 12, further comprising:
   adjusting a location of the second dummy layer or adjusting schematics of the first integrated circuit and the second integrated circuit if the second LVS check fails.

14. The method of claim 12, wherein adding the second dummy layer to the at least one of the at least one terminal of the SIPH device in the first layout of the first integrated circuit or the converted contact pads in the first layout of the first integrated circuit:
   adding the second dummy layer to every terminal of the SIPH device and every converted contact pad in the first layout of the first integrated circuit.

15. The method of claim 9, wherein the single first dummy layer is generated based on a parameterized cell base which defines at least one of a name of the SIPH device, a shape of the single first dummy layer, a size of the single first dummy layer and a location of the single first dummy layer.

16. A system for verifying an integrated circuit stack of a first integrated circuit and a second integrated circuit, the first integrated circuit comprising a silicon photonic (SIPH) device and the second integrated circuit comprising second contact pads, the system comprising:
   a non-transitory computer readable medium, configured to store instructions; and
   a processor, connected to the non-transitory computer readable medium, and configured to execute the stored instructions to:
      add a single first dummy layer to at least one terminal of the SIPH device in a first layout of the first integrated circuit, wherein a shape of the single first dummy layer added to the at least one terminal of the SIPH device maps a shape of the at least one terminal of the SIPH device;
      perform a first layout versus schematic (LVS) check on the first integrated circuit based on the single first dummy layer added to the at least one terminal of the SIPH device to verify a connection of the SIPH device in the first integrated circuit;
      convert locations of the second contact pads of the second integrated circuit to the first layout the first integrated circuit to generate converted contact pads in the first layout of the first integrated circuit;
      add a second dummy layer to at least one of the at least one terminal of the SIPH device in the first layout of the first integrated circuit or the converted contact pads in the first layout of the first integrated circuit; and
      perform a second LVS check on the integrated circuit stack including the first integrated circuit and the second integrated circuit based on the second dummy layer to verify the integrated circuit stack.

17. The system of claim 16, wherein the single first dummy layer only covers the at least one terminal of the SIPH device without covering an entire area of the SIPH device in the first layout of the first integrated circuit.

18. The system of claim 16, wherein the processor is configured to add the single first dummy layer to every terminal of the SIPH device in the first layout of the first integrated circuit.

19. The system of claim 16, wherein the processor is configured to add the second dummy layer to every terminal of the SIPH device and every converted contact pad in the first layout of the first integrated circuit.

20. The system of claim 16, wherein the single first dummy layer is generated based on a parameterized cell base which defines at least one of a name of the SIPH device, a shape of the single first dummy layer, a size of the single first dummy layer and a location of the single first dummy layer.

* * * * *